United States Patent [19]

Quast

[11] Patent Number: 4,645,189

[45] Date of Patent: Feb. 24, 1987

[54] HYDRAULIC DAMPING RUBBER ENGINE MOUNT

[75] Inventor: Jörn-Rainer Quast, Sinzig-Bad Bodendorf, Fed. Rep. of Germany

[73] Assignee: Boge GmbH, Eitorf, Fed. Rep. of Germany

[21] Appl. No.: 730,770

[22] Filed: May 3, 1985

[30] Foreign Application Priority Data

May 4, 1984 [DE] Fed. Rep. of Germany ....... 3416431

[51] Int. Cl.⁴ .............................................. F16F 9/08
[52] U.S. Cl. ................................. 267/140.1; 267/8 R; 267/113; 248/634; 280/710; 188/379
[58] Field of Search ............... 267/140.1, 140.2, 140.3, 267/140.4, 140.5, 8 R, 113; 188/298, 379; 248/562, 634, 636, 638; 280/710, 716

[56] References Cited

FOREIGN PATENT DOCUMENTS

| | | |
|---|---|---|
| 0027751 | 4/1981 | European Pat. Off. ......... 267/140.1 |
| 2935879 | 3/1980 | Fed. Rep. of Germany . |
| 2937052 | 8/1980 | Fed. Rep. of Germany . |
| 3024089 | 1/1982 | Fed. Rep. of Germany . |
| 3140783 | 4/1983 | Fed. Rep. of Germany ... 267/140.1 |
| 2727244 | 7/1983 | Fed. Rep. of Germany . |
| 3246205 | 6/1984 | Fed. Rep. of Germany . |
| 7913128 | 12/1980 | France . |
| 2041488 | 9/1980 | United Kingdom ............. 267/140.1 |
| 2041485 | 9/1980 | United Kingdom ............. 276/140.1 |
| 2132311 | 7/1984 | United Kingdom ............. 267/140.1 |

Primary Examiner—George E. A. Halvosa
Assistant Examiner—Matthew C. Graham
Attorney, Agent, or Firm—Nils H. Ljungman

[57] ABSTRACT

Hydraulic-vibrationally damping rubber mount for motor vehicles with two rigid end surfaces opposite one another in the axial direction and at least two chambers containing damping fluid arranged one after the other, whereby the chambers are connected with one another by means of a choke point. The partition delimiting the two chambers is designed rigidly in the outer region, and held in an axially-movable manner in the inner region. There is a fixed body included in the center. The elastic wall, by means of its flexibility, prevents any cavitation in the rubber mount. At the same time, the fixed body can be used as a tuned vibration-absorption mass for the frequency-dependent reduction of the dynamic spring rigidity. In addition, a bypass can be formed in the inner region, whereby by means of webs, a pre-stressed disc is pressed against a seal surface, so that for large amplitudes of generating a vacuum in the damping fluid causing cavitation, the pre-stressing is overcome, and releases a bypass, so that no disruptive vibrational effects occur.

19 Claims, 5 Drawing Figures

HYDRAULIC DAMPING RUBBER ENGINE MOUNT

CROSS REFERENCE TO CO-PENDING APPLICATIONS

Co-pending application Ser. No. 833,962, filed on Feb. 27, 1986, entitled "Rubber Mounting with Hydraulic Damping, Particulaly for Mounting Vehicle Engines", and co-pending application Ser. No. 851,879, filed on Apr. 11, 1986, entitled "Rubber Mounting With Hydraulic Damping"; are both assigned to the same assignee as the instant application and are incorporated herein by reference as if the entire texts thereof were set forth herein in their entirety.

BACKGROUND OF THE INVENTION

1. Field of the Invention

The invention relates to hydraulic damping rubber mounts and, more particularly, to hydraulically damped rubber engine mounts for motor vehicles.

2. Description of the Prior Art

Rubber mounts are used as mounts for drive systems in all types of motor vehicles. In mounts for internal combustion engines in motor vehicles, it is necessary on one hand to prevent noise vibration transmission, which has been achieved in the prior art by the use of a mount which is as soft as possible, and which has low self-damping. Unfortunately, a soft mount allows the movements of the motor excited by the roadway to become large which may cause bottoming of the mounts. On the other hand, the large movements of the engine in its mounts can be reduced by the use of hard engine mounts or separate vibration damping, but that leads to significant noise transmission to the body of the motor vehicle.

Rubber mounts of the prior art are known, for example, from European Patent Publication Published For Opposition Purposes No. 27 751, which has good damping in the range of low frequencies. A disadvantage here, however, is the fact that above a determined vibration amplitude or a determined frequency, cavitation occurs in the chamber, which leads to undesirable noise. Such cavitation occurs whenever, during the occurrence of large vibrations, the damping fluid flows from one chamber into the other chamber, and a vacuum forms in front of a region or point for relieving the pressure difference, since the fluid equilibrium cannot be established rapidly enough.

In the previous German Patent Application No. P 32 46 205.0, the problem of cavitation has already been addressed and solved. But this apparatus has a partition, which has a rigid middle region, and an elastic outer region which opens a bypass under conditions of pressure or vacuum build-up. As a result of the rigid central portion of the partition and the pressure relief point located in this portion, large masses must be moved when the bypass is opened, since the pressure relief point itself must also be moved. In addition, appropriate and expensive metal parts are necessary for clamping the partition.

OBJECT OF THE INVENTION

On this basis, the object of the invention is the creation of a simple-acting rubber mount, which eliminates cavitation phenomena which are associated with disruptive noises, in the low-frequency range at high amplitudes, caused by motor excitations from the roadway, or in the start-up and slow-down phase. This mount does not adversely affect an optimal isolation of the noise transmission from the motor to the body in the high-frequency range at low amplitudes, whereby at the same time, only small masses are to be moved.

SUMMARY OF THE INVENTION

To accomplish this object, the invention provides that the partition is rigidly clamped in a rigid, outer region having a choke point which throttles the flow of fluid in the mount. Running from the rigid region to the central axis, there is an elastic, tightly-clamped region with an axial defined play with respect to the rigid region. There is also a fixed and preferably rigid body in the center of the elastic region.

It is thereby advantageous that in the normal working range of the engine mount, there is no influence on the functions, noise isolation and damping but, at the large amplitudes of movement at which cavitation occurs, the elastic region is used in such a manner that a decrease of the pressure difference peaks between the chambers can be achieved.

Another important feature is that there is a disc connected to the fixed body, which is pre-stressed and in contact with the elastic region.

In addition, another important embodiment provides that in the elastic region, an axial recess, connecting the two chambers, forms a bypass orifice, which is sealed off by the disc when the disc is in the rest position.

An advantage here is that for large amplitudes, during which cavitation occurs, an exchange of fluid takes place by a flow of damping fluid through a bypass in parallel with the damping duct or other pressure relief arrangements in the rigid outer region of the partition. Thereupon, when sufficient vacuum has formed on the appropriate side thereof, the disc lifts up and away from the elastic range and the orifice recesses form additional flow ducts between the two chambers, thereby minimizing cavitation.

Such cavitation often occurs in the prior art engine mounts during the start-up and shutdown phases of an engine or motor, and also if there is a strong excitation caused by interaction of the vehicle with the roadway. The vacuum caused by the cavitation in the appropriate chamber counteracts the pre-stressing force between the elastic region and the disc, so that the disc raises up from its seal seat in the elastic region, and the exchange of fluids through the recesses becomes possible. As a result of the axial distance which the disc travels together with the fixed body, not only does an exchange of fluid become possible, but in addition, the volumes of both chambers also change. An advantage here is that the volume of the chamber which has a vacuum created therein is altered so that cavitation is counteracted. If the motion is reversed, a pre-stressing force is again applied by the elastic region on the fixed body and the disc, so that the bypass is closed.

It is also advantageous that the clamping of the elastic portion can be done easily about the rigid region, and the choke point is disposed in this rigid region, so that when the pressure activated bypass is in operation reducing the peak pressure differences, there need be no movement of the choke point. The resulting movements of masses are therefore lower than that in the prior art, thereby permitting a more rapid actuation of the pressure activated bypass.

According to one preferred embodiment, the choke point is designed as an annular channel or as several ducts distributed over the circumference, or as a hole or several holes. This embodiment provides favorable possibilities of varying not only the choke point itself, but also the determination of the bypass functions, since this makes possible greater latitude in the configuration of the middle region of the partition.

According to another important feature, the elastic range is radially pre-stressed and clamped in the rigid peripheral region and conical teeth are provided as a stop for the axial movement of the partition. This embodiment makes it possible for high-frequency vibrations to be absorbed by the central portion of the partition itself, and means that a damping by the choke point/points or portion does not take place until greater amplitudes of movement of the central portion occur than the play provided by the conical teeth. When greater vacuuming occurs, then the central portion is restrained in its upward movement.

According to an especially advantageous embodiment, the elastic region has a reinforcement.

According to another important feature, the fixed body is designed as a deep-drawn pot-shaped part. In addition, the disc and the fixed body are preferably rigidly connected to one another, for example, by spot welding or rivets. If such thin-walled components are used, the mass to be moved is kept very low.

According to another important embodiment of the invention, the elastic region having the recess or recesses exerts a biasing or pre-stressing action on the disc, so that the disc makes tight contact with the elastic region. As a result of such a pre-stressing bias, the elastic region acts as a rubber spring, so that a tight seating of the disc on this elastic region is assured. A control of the bypass thereby becomes possible. By means of an appropriate embodiment of the elastic region and/or of the disc, a variable bypass function can be determined, depending both on magnitude and frequency components of the vacuum created. Depending upon the application, a more or less strong pre-stressing can easily be applied.

In another embodiment of the invention, the fixed body and the disc are made of metal and/or non-metal material. For these components, the use of plastic is easily possible.

Another important feature in yet another embodiment of the invention is that the fixed body is made of solid material. The fixed body can also be designed as a vibration-absorption mass. In such an embodiment, depending upon the application, it may be advantageous for the fixed body to act as a vibration-absorption mass. This vibration absorption mass, tuned with the elastic region and/or other parts of the mount, is provided to reduce the dynamic spring stiffness as a function of the frequency.

BRIEF DESCRIPTION OF THE DRAWINGS

Preferred embodiments of the invention are shown in greater detail in the drawings.

DESCRIPTION OF THE PREFERRED EMBODIMENTS

Figure 1:
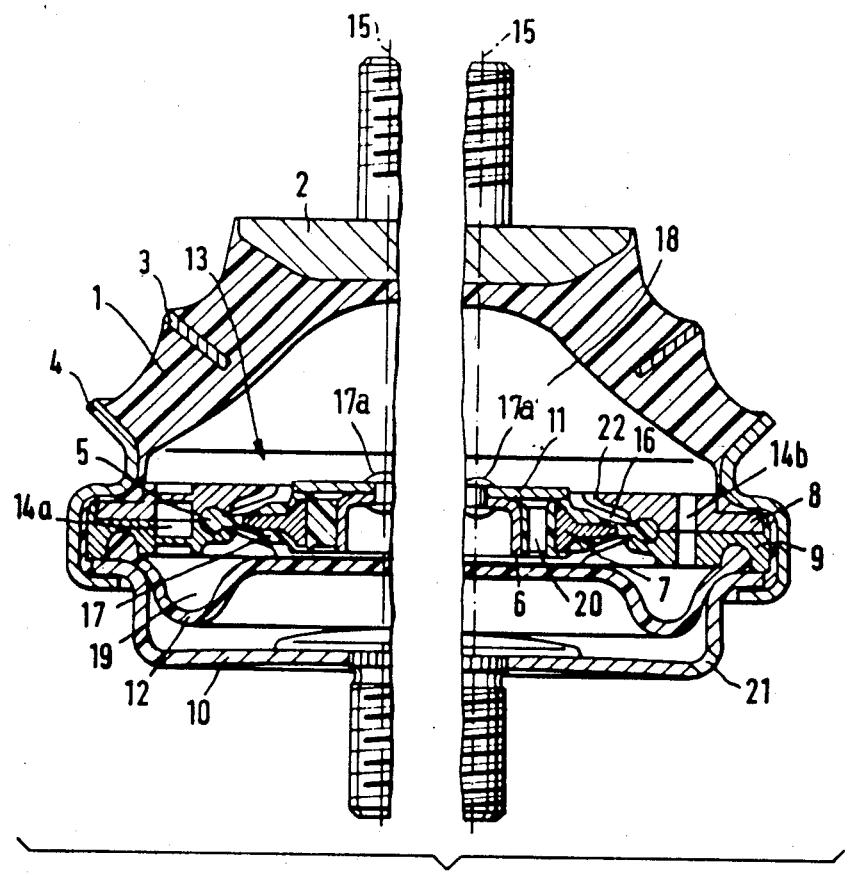
FIG. 1 shows an axial longitudinal section of an engine mount.

An engine mount illustrated in FIG. 1 has two end surface structures 2 and 10 opposite one another in the axial direction. The end surface structures 2 and 10 are provided with threaded rods for their fastening to an engine on one end, and to a motor vehicle body on the other end, or can be manufactured with corresponding threaded holes or other attaching arrangements known in the prior art (not shown). Molded onto the peripherally spherical jacket surface of the end surface structure 2 is a circumferential wall designed as an elastic rubber spring element 1. The elastic rubber spring element 1 preferably has a reinforcement element 3 molded therein for adding structural integrity thereto. At the attachment surface facing away from its end surface structure 2, the circumferential wall is joined with a connecting flange 4. The connecting flange 4 also comprises a raised edge, which holds a partition 13, a bellows 12 and the end surface structure 10.

Therefore, the engine mount has two chambers 18 and 19 containing damping fluid separated from one another by the partition 13, in which the chamber 18 is designed as a pressure chamber wherein the vacuum to be relieved is created by movements of the engine mount and the chamber 19 as a nearly unpressurized elastic equalization chamber. For the sake of completeness, it should be noted that there is at least one evacuation opening 21 in the end surface structure 10.

A choke point 14a or 14b for relieving pressure, or rather vacuum, in a predetermined range between the two chambers 18 and 19, is disposed in the partition 13 which comprises either one or several annular penetration ducts 14a and/or one or more holes 14b. This choke point 14a or 14b is in active operation in the normal working range of the mount and is substantially solely operable when peak pressure differences between the two chambers 18 and 19 are not great.

The partition 13 is designed to be rigid in an external region 8 which is rigidly clamped between the end surface structures 2 and 10. This rigid region 8 contains the choke point 14a or 14b. From this rigid region 8 toward a longitudinal, central axis 15, there is an elastic region 17, which is radially clamped by means of the suspension 5, in the form of a bead, in the rigid region 8. The rigid region 8 is thereby divided transversely with respect to the central axis 15.

Figure 2:
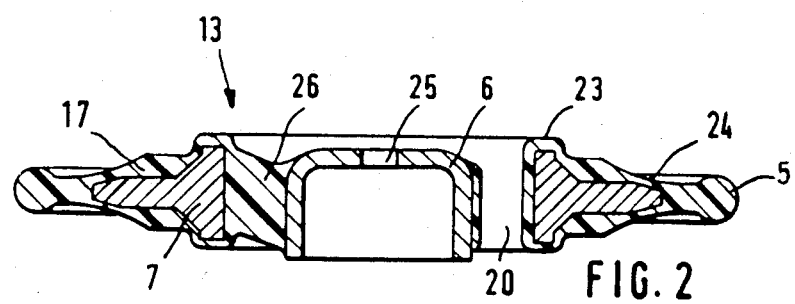
FIG. 2 shows a view of the elastic region of the partition in cross section.

The elastic region 17 is provided with, by means of conical teeth 22 distributed on the circumference of the rigid region 8, an axially-defined play 16 during the operation of the mount to limit the upward movement of the elastic region 17. In the center of the elastic region 17 there is a fixed body 6, which is connected with the elastic region 17 by means of molded-on webs 26 (as shown in FIG. 2), so that recesses comprising orifices 20 remain which form the bypass. In the rest position, there is a sealing of the orifices 20 by means of a disc 11, since the disc 11 is braced against the elastic region 17 by a rivet 17a. When there is relative vacuum of sufficient magnitude in the chamber 18, the disc 11 rises up from the elastic region 17 and the bypass between the chambers 18 and 19 is opened by the orifice 20, allowing fluid flow therebetween.

This fluid exchange between the chambers 18 and 19 takes place whenever there is relative vacuum in the chamber 18, which overcomes the pre-stressing of either the elastic region 17 or the disc 11, so that the disc 11 is lifted up from the sealing surface 23 (as shown in FIG. 2) of the elastic region 17. After the pressure equalization which takes place in this manner by the release of the vacuum in the chamber 18, the pre-stressing of the elastic region 17 takes effect once more by the resealing of the disc 11 against the sealing surface 23. After the resealing of the disc 11 on the seal surface 23, the so called normal operating range of the rubber mount is once again reached.

FIG. 2 shows the middle portion of the partition 13. Starting from the periphery, there is the suspension 5 of the elastic region 17. Then there follows a conically shaped region 24, which is strengthened by a reinforcement 7. In the center of this elastic region 17, there is a fixed body 6 in the form of a pot-shaped deep-drawn part, which has the hole 25 for holding the disc 11. Between the conical region 24 and the fixed body 6, there are webs 26 distributed around the circumference which preferably pre-stress the fixed body 6. Spaces in between the webs 26 form the orifices 20. These orifices 20 are used to form the bypass.

Figure 3:
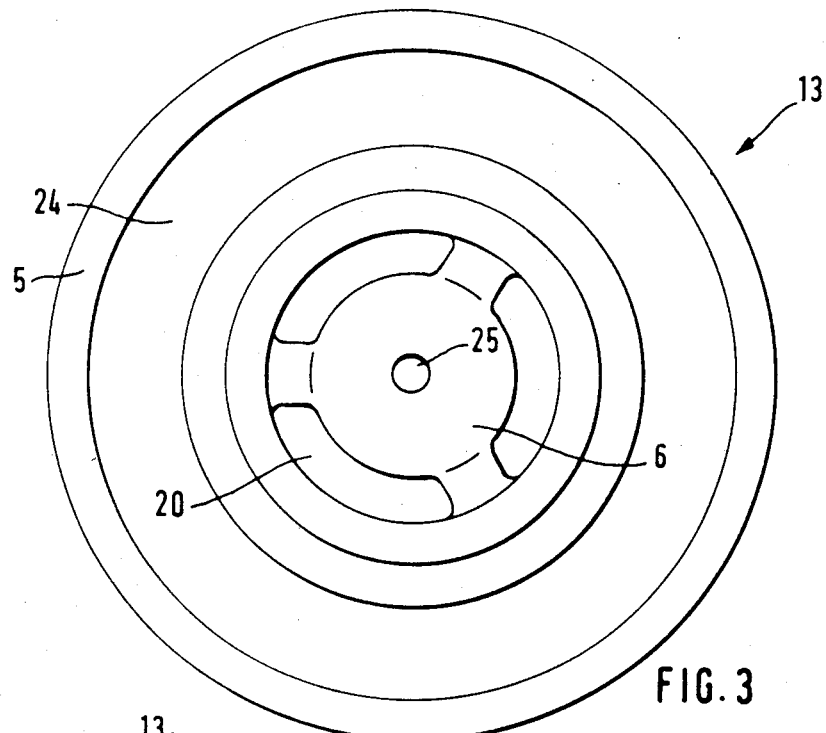
FIG. 3 shows a top view of the partition illustrated in FIG. 2.

FIG. 3 shows top view of the portion of the partition 13 illustrated in FIG. 2. The fixed body 6 is shown therein being provided with the hole 25, whereby the orifices 20 form the bypass. The conically shaped region 24 narrows gradually toward its outer circumference, and the suspension 5 serves for the radial fastening arrangement for the mounting of the partition 13 in the rigid regions 8 and 9 (as shown in FIG. 1).

Figure 4:
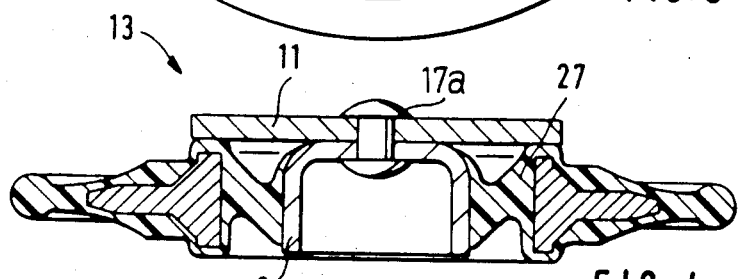
FIG. 4 shows the partition without a bypass, but with an appropriate volumetric elasticity.

FIG. 4 shows one model of a partition 13, which does not have a bypass. The fixed body 6 is held in the partition 13 by means of an inner region 27, forming an annular region which surrounds the fixed body 6. A disc 11 is preferably provided which allows the free flexing of the inner region 27 to release peak vacuum which exceeds a predetermined value when generated in the chamber 18 (as shown in FIG. 1). The elastic flexibility of this annular region enclosed within the outer periphery can thereby be used to reduce the pressure difference peaks between the chambers 18 and 19 (as shown in FIG. 1).

Figure 5:
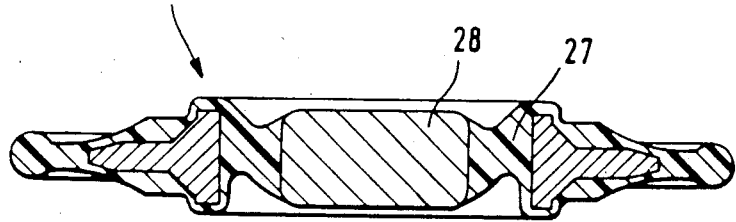
FIG. 5 shows the partition with a fixed body designed as a vibration-absorption mass with or without the corresponding volumetric elasticity.

FIG. 5 shows another alternative embodiment, on which there is also no bypass. A fixed body 28 in this embodiment is designed as a vibration absorption mass 28 and is contained in the annular region 27 enclosed in the partition 13. The other embodiments may also have their fixed bodies 6 adapted to be vibration absorbers. Here, too, the elastic flexibility of the annular region 27 is used to reduce the pressure difference or vacuum peaks between the chambers 18 and 19 (as shown in FIG. 1), and in cooperation with the vibration-absorption mass 28 as well as the selected rigidity of the annular region 27, there is a vibration-damping action as a function of the frequency which reduces the dynamic stiffness at selected frequencies, or a range or ranges of frequencies. The characteristics of the vibration-absorption mass 28 can thereby be appropriately chosen and made of a metal or plastic material.

The invention is not to be taken as limited to all the details that are described hereinabove, since modifications and variations thereof may be made without departing from the spirit or scope of the invention.

What is claimed is:

1. A hydraulically damped vibrationally damping rubber engine motor vehicle mounting device having at least a longitudinal axis along which damping is prevalent, said device having rigid opposite end portions with mounting means thereat, aligned with said longitudinal axis;
    said device being of the type including an elastomeric structure being attached to said opposite end portions;
    at least two chambers containing damping fluid being disposed one adjacent another along said longitudinal axis, said at least two chambers being separated by partition means having an outer, rigid, peripheral portion and an inner, axially movable portion, having elastic properties, disposed within said outer portion;
    said partition means having movement limiting means for limiting movement of said inner portion with respect to said outer portion;
    said outer portion having means for holding a portion of said inner portion;
    said inner portion having elastic properties comprising an elastic portion being tightly clamped by said holding means of said outer portion;
    first pressure relieving means for relieving a pressure difference within a first predetermined range of pressure between said at least two chambers, said first pressure relieving means being disposed at a portion of said outer, rigid, portion of said partition means and being disposed to connect said at least two chambers by substantially the shortest connection therebetween;
    said inner portion of said partition means having second pressure relieving means for uni-directionally relieving a pressure difference between said at least two chambers from a first chamber to a second chamber of said chambers in a range that is greater than a second predetermined pressure range and that begins to relieve pressure at a first predetermined pressure differential to minimize cavitation in said damping fluid; and
    said second pressure relieving means including a disc attached to said inner portion, said disc being pre-stressed for exerting a force against said inner portion of said partition means;
    second pressure relieving means being closed by said disc at least when said pressure difference said first chamber and said second chamber is substantially zero.

2. The hydraulically damped vibrationally damping rubber mounting device according to claim 1 wherein said second pressure relieving means comprises at least one orifice for connecting said at least two chambers.

3. The hydraulically damped vibrationally damping rubber mounting device according to claim 1 wherein said second pressure relieving means comprises a flexible member in said inner portion of said partition means.

4. The hydraulically damped vibrationally damping rubber mounting device according to claim 1 wherein said second pressure relieving means comprises at least a portion of said inner portion of said partition means which has at least one means between said at least two chambers to form a bypass therebetween for further reducing said pressure differences greater than said second predetermined range therebetween than said first pressure relieving means; and
    said bypass being sealed by said disc when said pressure difference between said at least two chambers is less than said second predetermined pressure range.

5. The hydraulically damped vibrationally damping rubber mounting device according to claim 4 wherein said second pressure relieving means comprises at least one orifice in said inner portion.

6. The hydraulically damped vibrationally damping rubber mounting device according to claim 4 wherein said second pressure relieving means comprises at least one annular channel disposed along a circumference of said elastic inner portion.

7. The hydraulically damped vibrationally damping rubber mounting device according to claim 1 wherein said outer, peripheral portion of said portion means comprises a rigid region in which said first pressure relieving means is disposed.

8. The hydraulically damped vibrationally damping rubber mounting device according to claim 7 wherein said first pressure relieving means comprises at least one orifice connecting said at least two chambers.

9. The hydraulically damped vibrationally damping rubber mounting device according to claim 7 wherein said first pressure relieving means comprises at least one channel within said outer, peripheral portion being closed to said damping fluid within the said first chamber and said second chamber whereby said damping fluid does not freely flow therethrough between said first chamber and said second chamber.

10. The hydraulically damped vibrationally damping rubber mounting device according to claim 7 wherein said rigid region and said inner portion of said partition means define a space therebetween for movement of said inner portion along said longitudinal axis with respect to said rigid region.

11. The hydraulically damped vibrationally damping rubber mounting device according to claim 10 wherein said movement limiting means includes axial movement restraining means to restrain said longitudinal movement of said elastic inner portion with respect to said outer, peripheral portion when said longitudinal movement exceeds a predetermined distance.

12. The hydraulically damped vibrationally damping rubber mounting device according to claim 1 wherein said inner region of said partition means has a rigid body affixed in a central portion thereof.

13. The hydraulically damped vibrationally damping rubber mounting device according to claim 12 wherein said rigid body comprises a pot-shaped deep drawn component.

14. The hydraulically damped vibrationally damping rubber mounting device according to claim 12 wherein said disc is rigidly connected to said rigid body.

15. The hydraulically damped vibrationally damping rubber mounting device according to claim 14 wherein said disc makes tight sealing contact with said rigid body when said pressure difference is less than said second predetermined pressure range.

16. The hydraulically damped vibrationally damping rubber mounting device according to claim 14 wherein said rigid body comprises metal.

17. The hydraulically damped vibrationally damping rubber mounting device according to claim 14 wherein said rigid body comprises non-metal.

18. The hydraulically damped vibrationally damping rubber mounting device according to claim 14 wherein said rigid body comprises a solid body.

19. The hydraulically damped vibrationally damping rubber mounting device according to claim 14 wherein said rigid body comprises a vibration absorbing mass.

* * * * *